2,770,637
PRODUCTION OF OXYGENATED
HYDROCARBONS

Robert L. Mitchell and Oren V. Luke, Corpus Christi, Tex., assignors to Celanese Corporation of America, New York, N. Y., a corporation of Delaware No Drawing. Application September 4, 1952,
Serial No. 307,908

2 Claims. (Cl. 260—451)

This invention relates to the production of oxygenated hydrocarbons and relates more particularly to an improved process for the production of oxygenated hydrocarbons by the vapor phase partial oxidation of hydrocarbon materials.

The production of oxygenated hydrocarbons by the vapor phase partial oxidation of hydrocarbon materials has long been known. In carrying out this process, a mixture of the hydrocarbon material and oxygen is heated to an elevated temperature somewhat below the temperature at which the reaction will take place in an uncontrolled manner and with great rapidity and the heated reaction mixture is passed through a reaction line to cause the reaction to proceed. The reaction mixture is then cooled and the oxygenated hydrocarbons are separated therefrom.

When the progress of the reaction is followed closely, it is found that after the reaction mixture is heated to an elevated temperature there is an induction period during which time little or no oxidation of the hydrocarbon materials takes place. The reaction then "kicks off" and goes forward rapidly until all the available oxygen is utilized. After the reaction kicks off there is a rapid rise in the temperature of the reaction mixture owing to the liberation of large quantities of heat by the exothermic oxidation reaction. The length of the induction period varies inversely with the temperature to which the reaction mixture is heated; being quite short when the mixture is heated to higher temperatures and increasing in length as the temperature to which the reaction mixture is lowered. Heating of the reaction mixture to higher temperatures to shorten the induction poried is advantageous in that it permits reducing the size of the reaction line for a given rate of flow of the reaction mixture. However, larger amounts of fuel are required to heat the reaction mixture to these higher temperatures. In addition, when the reaction mixture is heated to these higher temperatures, the final temperature which the reaction mixture reaches at the end of the reaction will be higher so that a greater cooling capacity will be required to lower the temperature of said mixture to permit the oxygenated hydrocarbons to be recovered therefrom. The higher final temperatures will also tend to accelerate the rate at which de-composition reactions take place in the reaction mixture with the production of materials such as carbon monoxide, carbon dioxide and water which have little or no commercial value. In addition, the higher final temperatures will tend to cause the production of certain substances, such as methane and the like, which are of lower economic value in the oxidation process since they do not oxidize readily to produce oxygenated hydrocarbons. On the other hand, heating of the reaction mixture to lower temperatures is undesirable in that such temperatures involve relatively long induction periods so that the reaction line must be made uneconomically large.

It is an important object of this invention to provide a process for the production of oxygenated hydrocarbons which will be free from the foregoing and other disadvantages and which will be especially simple and efficient in operation.

A further object of this invention is to provide a process for the production of oxygenated hydrocarbons by the partial oxidation of hydrocarbon materials according to which the induction period following the heating of the reaction mixture may be shortened materially without the necessity of heating the said mixture to higher temperatures.

Another object of this invention is to provide a process for the production of oxygenated hydrocarbons by the partial oxidation of hydrocarbon materials according to which there is introduced into a reaction mixture containing oxygen and hydrocarbon materials a substance which will decompose to liberate free radicals whereby the induction period following the heating of the reaction mixture is shortened materially.

A still further object of this invention is to provide a process for the production of oxygenated hydrocarbons by the partial oxidation of hydrocarbon materials according to which there is introduced into a reaction mixture containing oxygen and hydrocarbon materials an organic peroxide whereby the induction period following the heating of the reaction mixture is shortened materially.

Other objects of this invention will be apparent from the following detailed description and claims.

According to the present invention, a main stream comprising a reaction mixture containing oxygen and hydrocarbon materials is heated to an elevated temperature but below that at which an oxidation reaction will take place therein in an uncontrolled manner and with great rapidity. There is introduced into this main stream an auxiliary stream comprising a substance which will decompose to liberate free radicals at the temperature to which the main stream has been heated. The introduction of the auxiliary stream greatly shortens the induction period before the reaction in the main stream kicks off. As a result, it is possible, when the reaction mixture in the main stream is heated to a given temperature, through the introduction of the auxiliary stream to reduce the size of the reaction line. A more important advantage of the process of the instant invention is that through the introduction of the auxiliary stream, it is possible to carry out the reaction in the main stream at lower temperatures without the use of reaction lines of excessive length. Thus, when an auxiliary stream is introduced into the main stream it is possible to lower the temperature to which the reaction mixture is heated by from about 30 to 150° F., or even more for a reaction line of given size. This produces a corresponding reduction in the maximum temperature to which the reaction mixture will rise during the oxidation reaction. As a result, there is a saving not only in the amount of fuel needed to heat the reaction mixture prior to the reaction, but also in the cooling capacity needed to cool the mixture after the reaction to permit the recovery of the oxygenated hydrocarbons therefrom. The reduction in the maximum temperature to which the reaction mixture will rise during the oxidation reaction also decreases the rate at which decomposition reactions take place thereby improving the overall efficiency of the process.

In carrying out the oxidation reaction, the hydrocarbon materials may include, for example, ethane, propane, butane, pentane and the like, as well as the corresponding unsaturated hydrocarbons such as ethylene, propylene, butylene, pentylene and the like, either alone or in admixture with each other. The hydrocarbon materials may be mixed with from about 2 to 25 mole percent of oxygen in the form of air, oxygen enriched air, pure oxygen or the like. The lower percentages of oxygen give a lower conversion but a higher efficiency since the formation of degradation products is reduced and the higher percentages of oxygen give a higher conversion but a lower efficiency since more degradation products are produced. Preferably the hydrocarbon materials and oxygen are mixed and then heated, but they may be heated separately and then mixed one with the other. The temperature to which the reaction mixture in the main stream is heated may range from about 500 to 700° F., or preferably between about 550 and 650° F. The pressure at which the reaction is carried out may range from about 20 to 300 pounds per square inch gauge. Under these conditions the induction period is between about 0.5 and 5 seconds.

Into the main stream there is introduced an auxiliary stream containing a substance which will decompose readily to liberate free radicals at the temperature reached by the main stream during the induction period. The free radical-liberating substance may be introduced into the main stream before the said main stream is heated, during the heating of the main stream, or after the main stream has been heated and during the induction period. An especially valuable class of free radical-liberating substances that are suitable for carrying out the process of this invention are the organic peroxides, which liberate organic free radicals such as the alkyl peroxides or hydroperoxides, including ditertiary butyl peroxide, peracetic acid, tertiary butyl hydroperoxide, acetyl peroxide and benzoyl peroxide. Other free radical-liberating substances include, for example, diacetyl, tetraethyl lead, dimethyl mercury, and many others. In general, the free-radical-liberating substances should have a half-life (time required for 50% decomposition) not in excess of about 0.5 second at the temperature reached by the main stream during the induction period. The most effective free-radical-liberating substances are those which decompose primarily in the vapor phase rather than those in which the decomposition is primarily a surface reaction. The free radical-liberating substance is advantageously employed in concentrations of between about 0.05 to 2.0 volume percent based on the total volume of the main stream. Lower concentrations are relatively ineffective in reducing the induction periods whereas higher concentrations are inefficient since they do not offer a materially greater reduction in the induction period than is obtained when operating within the limits specified.

Following the introduction of the auxiliary stream into the main stream, the oxidation reaction will begin in the main stream as it flows through the reaction line after a much shortened induction period and will continue until all the available oxygen has been utilized. The reaction mixture is then cooled, as by quenching with an aqueous medium, and the oxygenated hydrocarbons are than recovered therefrom. The unreacted residue may be recycled through the reaction to utilize the hydrocarbons therein. To prevent the build-up in the reaction mixture of excessive quantities of diluent gases such as nitrogen, carbon monoxide, carbon dioxide or the like, the unreacted residue or a portion thereof may be passed through a hydrocarbon recovery system where the useful hydrocarbons are recovered for further use while the diluents and inert gases are discarded.

The following examples are given to illustrate this invention further.

*Example I*

A stream of normal butane is mixed with 0.65 volume of air at a pressure of 100 pounds per square inch gauge and there is added to the mixture 0.1% by volume of ditertiary butyl peroxide. The reaction mixture is passed into a furnace wherein it is heated to a temperature of 575° F. following which it enters a reaction line. In the reaction line the oxidation reaction goes to completion, the reaction mixture reaching a maximum temperature of 710° F. Following the completion of the reaction, the reaction mixture is quenched with an aqueous medium and the oxygenated hydrocarbons are recovered therefrom while the unreacted residue is recycled.

When no free radical-liberating substance is introduced into the reaction mixture, it is necessary to heat the reaction mixture to a temperature of 600° F. in the furnace to insure that the oxidation reaction will go to completion and the reaction mixture reaches a maximum temperature of 805° F. in the reaction line.

*Example II*

A stream of normal butane is mixed with 0.65 volume of air at a pressure of 100 pounds per square inch gauge and there is added to the mixture 0.2% by volume of ditertiary butyl peroxide. The reaction mixture is passed into a furnace wherein it is heated to a temperature of 570° F. following which it enters a reaction line. In the reaction line the oxidation reaction goes to completion, the reaction mixture reaching a maximum temperature of 655° F. Following the completion of the reaction, the reaction mixture is quenched with an aqueous medium and the oxygenated hydrocarbons are recovered therefrom while the unreacted residue is recycled.

It is to be understood that the foregoing detailed description is given merely by way of illustration and that many variations may be made therein without departing from the spirit of our invention.

Having described our invention what we desire to secure by Letters Patent is:

1. In a process for the production of oxygenated hydrocarbons by the vapor phase partial oxidation of normally gaseous saturated aliphatic hydrocarbon materials at a pressure of between about 20 and 300 pounds per square inch wherein a main stream comprising a reaction mixture containing oxygen and said hydrocarbon materials, said mixture containing between about 2 and 25 mole percent oxygen on the hydrocarbons, is heated to an elevated temperature of about 500° to 700° F. and below that at which the oxidation reaction will take place in an uncontrolled manner and the oxidation reaction proceeds at a rapid rate after an induction period of about 0.5 to 5 seconds, the improvement which comprises introducing into the main stream an auxiliary stream comprising an alkyl peroxide which will decompose to liberate free radicals at the temperature reached by the reaction mixture during the induction period in an amount sufficient to yield a concentration of at least about 0.05 volume percent on the volume of the main stream, said substance being essentially the sole added reaction promoter in said reaction mixture.

2. In a process for the production of oxygenated hydrocarbons by the vapor phase partial oxidation of butane wherein a main stream comprising a reaction mixture containing oxygen and butane is heated to an elevated temperature of between about 550 and 650° F. and below that at which the oxidation reaction will take place in an uncontrolled manner and the oxidation reaction proceeds at a rapid rate after an induction period, the improvement which comprises introducing into the main stream an auxiliary stream comprising ditertiary butyl peroxide which will decompose to liberate free radicals at the temperature reached by the reaction mixture during the induction period in an amount sufficient to yield a concentration of at least about 0.05 volume percent on the volume of the main stream, said substance being essentially the sole added reaction promoter in said reaction mixture.

References Cited in the file of this patent

UNITED STATES PATENTS

| | | |
|---|---|---|
| 2,226,378 | King et al. | Dec. 24, 1940 |
| 2,265,948 | Loder | Dec. 9, 1941 |
| 2,421,392 | Rust et al. | June 3, 1947 |
| 2,469,322 | Armstrong et al. | May 31, 1949 |
| 2,689,253 | Robertson et al. | Sept. 21, 1944 |